United States Patent Office

Re. 25,260
Reissued Oct. 16, 1962

25,260

STABILIZING DIENE RUBBERS WITH THE REACTION PRODUCT OF P-AMINO DIPHENYLENAMINE AND STYRENE

Farris H. Wilson, Jr., Cuyahoga Falls, Ohio, assignor to The Goodyear Tire & Rubber Company, Akron, Ohio, a corporation of Ohio No Drawing. Original No. 2,984,646, dated May 16, 1961, Ser. No. 725,487, Apr. 1, 1958. Application for reissue Jan. 10, 1962, Ser. No. 166,001
2 Claims. (Cl. 260—45.9)

Matter enclosed in heavy brackets [ ] appears in the original patent but forms no part of this reissue specification; matter printed in italics indicates the additions made by reissue.

This invention relates to the preservation of oxidizable compositions such as rubbers and petroleum products and, more particularly, to the provision and use of a new class of N-aralkyl N′-phenyl phenylene diamines which are useful as age resistors for the various oxidizable rubbers and petroleum products.

Unsaturated materials such as rubbers and gasoline are subject to deterioration from many sources, such as sunlight, ozone, atmospheric oxygen, the presence of heavy metals, etc. Both cured and uncured natural and synthetic elastomers are subject to such deterioration. Deterioration in cured stocks of rubber may vary with the type of stock, the state of cure and the amount of surface exposed. Also, the temperature of the oxidizable compositions is an important factor in deterioration. An ideal antioxidant or antiozonant would be one which would protect the oxidizable compound from deterioration regardless of time, physical state of the oxidizable compound, and regardless of use. Since no such general antioxidant or antiozonant has been discovered, compromises must be made in the selection of an age resistor for a particular use.

It is an object of the present invention to provide antioxidant and antiozonant compositions which are capable of protecting various oxidizable rubbers and petroleum products for extended periods of time. It is another object of this invention to provide N-aralkyl N′-phenyl phenylene diamines which are capable of protecting various oxidizable rubbers and petroleum products from deterioration from oxygen, ozone, and/or sunlight.

In the practice of the invention, oxidizable compositions are protected from deterioration by means of N-aralkyl N′-phenyl phenylene diamines. The N-aralkyl N′-phenyl phenylene diamines of this invention can be further described as N-aralkyl N′-phenyl phenylene diamines conforming to the following structure:

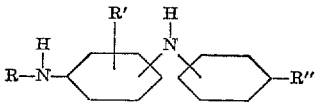

wherein R is an aralkyl radical, R′ is a radical selected from hydrogen, alkyl radicals, alkoxy radicals, and halogen radicals and wherein R″ is a radical selected from hydrogen, alkyl radicals, alkoxy radicals, and halogen radicals. The alkyl radicals may be primary, secondary, or tertiary and may contain from 1 to 9 carbon atoms. The alkoxy radicals may also contain from 1 to 9 carbon atoms in addition to the oxygen. The halogen radicals may be any of the halogens such as fluorine, chlorine and bromine. The aralkyl radicals may be derived from unsaturated aralkyl compositions such as styrene, substituted styrenes, e.g. styrenes substituted in the ring with alkyl radicals having from 1 to 9 carbon atoms, alkoxy radicals having from 1 to 9 carbon atoms, halogens, nitro groups; vinyl toluene; etc.

Representative N-aralkyl N′-phenyl phenylene diamines which are useful in the practice of this invention are:

N-phenethyl-N′-phenyl-para-phenylene-diamine
N-(ortho, meta or para methyl phenethyl)-N′-phenyl-para-phenylene diamine
N-(ortho, meta or para ethyl phenethyl)-N′-phenyl-para-phenylene diamine
N-(ortho, meta or para methoxy phenethyl)-N′-phenyl-para-phenylene diamine
N-(ortho, meta or para ethoxy phenethyl)-N′-phenyl-para-phenylene diamine
N-(ortho, meta or para chloro phenethyl)-N′-phenyl-para-phenylene diamine
N-(ortho, meta or para bromo phenethyl)-N′-phenyl-para-phenylene diamine
N-(ortho, meta or para cyclohexyl phenethyl)-N′-phenyl-para-phenylene diamine
N-(ortho, meta or para methyl phenethyl)-N′-(ortho, meta or para tolyl) para-phenylene diamine
N-(ortho, meta or para ethyl phenethyl)-N′-(ortho, meta or para tolyl) para-phenylene diamine
N-(ortho, meta or para methoxy phenethyl)-N′-(ortho, meta or para tolyl) para-phenylene diamine
N-(ortho, meta or para ethoxy phenethyl)-N′-(ortho, meta or para tolyl) para-phenylene diamine
N-(ortho, meta or para chloro phenethyl)-N′-(ortho, meta or para tolyl) para-phenylene diamine
N-(ortho, meta or para bromo phenethyl)-N′-(ortho, meta or para tolyl) para-phenylene diamine
N-(phenethyl)-N′-(ortho, meta or para tolyl) para-phenylene-diamine
N-phenethyl-N′-(ortho, meta or para ethyl phenyl)-para-phenylene diamine
N-(ortho, meta or para methyl phenethyl)-N′-(ortho, meta or para ethyl phenyl)-para-phenylene diamine
N-(ortho, meta or para methoxy phenethyl)-N′-(ortho, meta or para ethyl phenyl)-para-phenylene diamine
N-(ortho, meta or para ethoxy phenethyl)-N′-(ortho, meta or para ethyl phenyl)-para-phenylene diamine
N-(ortho, meta or para chloro phenethyl)-N′-(ortho, meta or para ethyl phenyl)-para-phenylene diamine
N-(ortho, meta or para bromo phenethyl)-N′-(ortho, meta or para ethyl phenyl)-para-phenylene diamine
N-(ortho, meta or para cyclohexyl phenethyl)-N′-(ortho, meta or para ethyl phenyl)-para-phenylene diamine
N-(ortho, meta or para methyl phenethyl)-N′-(ortho, meta or para methoxy phenyl)-para-phenylene diamine
N-(ortho, meta or para ethyl phenethyl)-N′-(ortho, meta or para methoxy phenyl)-para-phenylene diamine
N-(ortho, meta or para methoxy phenethyl)-N′-(ortho, meta or para methoxy phenyl)para-phenylene diamine
N-(ortho, meta or para-ethoxy phenethyl)-N′-(ortho, meta or para methoxy phenyl) para-phenylene diamine
N-(ortho, meta or para chloro phenethyl)-N′-(ortho, meta or para methoxy phenyl) para-phenylene diamine
N-(ortho, meta or para bromo phenethyl)-N′-(ortho, meta or para methoxy phenyl) para-phenylene diamine
N-(ortho, meta or para cyclohexyl phenethyl)-N′-(ortho, meta or para methoxy phenyl) para-phenylene diamine
N-phenethyl-N′-phenyl-2 or 3 methyl-para-phenylene diamine
N-(ortho, meta or para methylphenethyl-N′-phenyl-2 or 3 methyl-para-phenylene diamine
N-phenethyl N′-ortho-meta or para tolyl-2 or 3 methyl-para-phenylene diamine
N-phenethyl-N′-phenyl-2 or 3 methoxy-para phenylene diamine
N-(ortho, meta or para methyl phenethyl)-N′-phenyl-2 or 3 methoxy-para-phenylene diamine
N-phenethyl-N′-tolyl-2 or 3 methoxy-para-phenylene diamine The para-phenylene diamines have been used to illustrate the invention but the ortho or meta derivatives may also be used.

The N-aralkyl N-phenyl phenylene diamines of this invention may be made by reacting a phenylene diamine with an aralkyl composition. Illustrative of the phenylene diamines which may be used to provide the compositions of this invention are:

N-phenyl-para-phenylene diamine
N-tolyl-para-phenylene diamine
N-ethylphenyl-para-phenylene diamine
N-chlorophenyl-para-phenylene diamine
N-bromophenyl-para-phenylene diamine
N-methoxyphenyl-para-phenylene diamine
N-ethoxyphenyl-para-phenylene diamine
N-phenyl-(2 or 3 methyl)-para-phenylene diamine
N-tolyl-(2 or 3 methyl)-para-phenylene diamine
N-phenyl-(2 or 3 methoxy)-para-phenylene diamine, etc.

The para-phenylene diamines have been used to illustrate the invention but the ortho or meta isomers may also be used.

The aralkyl compositions which may be used are: styrene; ortho, meta or para methyl styrene; ortho, meta or para ethyl styrene; ortho, meta or para methoxy styrene; ortho, meta or para ethoxy styrene; ortho, meta or para chloro styrene; ortho, meta or para bromo styrene; ortho, meta or para nitro styrene; etc.

In the practice of this invention, the aralkyl compositions and phenylene diamines are customarily reacted in the presence of a catalyst. The alkali metals such as sodium, potassium, lithium, etc., may be used, sodium being preferred. In addition, the hydrides and amides of the alkali metals may also be used to catalyze the reaction. The catalyst may be present in a catalytic amount ranging from a trace, e.g., 0.01% by weight, to about 5.0% by weight, based on the weight of the reactants. Tests have indicated that about 0.05 to about 0.25% by weight of catalyst is preferred.

Although the temperature of reaction is not critical, it is preferred to complete the reactions of this invention within a temperature range of about 125° C. to 250° C. For best results, a temperature ranging from about 170° C. to 200° C. is preferred.

The invention may be further illustrated by means of the following examples which are not intended as limitations on the scope of the invention:

EXAMPLE 1

Three hundred eighty-six grams of para-amino diphenyl amine were charged to a one liter flask equipped with stirrer, thermometer, reflux condenser, dropping funnel and nitrogen inlet. The flask was flushed with nitrogen and a slow stream was passed in during the reaction. Heating was begun and 4 grams of freshly cut sodium were added. At 175° C., 230 grams of styrene were added dropwise during a period of 2¼ hours while the temperature rose to 198° C. The reaction mixture was heated an additional 2¾ hours at 190-200° C. It was allowed to cool and 300 milliliters of benzene followed by 10 milliliters of water were added. The mixture was refluxed for one hour and then a water trap was inserted. Refluxing was continued until no further water was collected. The solution was filtered while still warm and then distilled, giving 315 grams of N-phenethyl-N'-phenyl-para-phenylene diamine having a boiling point of 215–220° C. at 0.35 millimeter and a melting point of 57–63° C. This represents a 54.5% yield. By recrystallization from hexane, a light crystalline solid having a melting point of 68–70° C. was obtained. *This recrystallized product was substantially pure N-beta-phenethyl-N'-phenyl-para-phenylene diamine.*

EXAMPLE 2

One hundred eighty-four grams of para-amino diphenyl amine were heated to 150° C. under a slow stream of dry nitrogen which was maintained during the reaction. Four grams of a 50% sodium dispersion in xylene were added and at 155° C. 115 grams of styrene were started in dropwise. It was added over a three-hour period with the temperature rising to 175° C. and then dropping back to 158° C. The mixture was heated for 20 hours after the addition of the styrene during which time the temperature gradually rose to 180° C. The mixture was allowed to cool after which 200 milliliters of benzene followed by 5 milliliters of water were added. The mixture was refluxed one hour, a water trap inserted and refluxing continued until no further water was collected. The mixture was filtered and stripped to 205° C. pot temperature at 19 millimeters pressure. A 30 gram sample was removed and analyzed by chromatography, giving a 54.4% yield of the N-phenethyl-N'-phenyl-para-phenylene diamine. The remainder was distilled and 137 grams of product obtained having a boiling point of 205–210° C. at 0.2 millimeter pressure and a melting point of 58–64° C. This corresponds to a 53.5% yield.

EXAMPLE 3

One hundred eighty-four grams of para-amino diphenyl amine were melted down in a 1 liter flask under a slow stream of dry nitrogen which was maintained during the reaction. Two grams of sodium were added and at 100° C. 115 grams of styrene were added dropwise during a period of 25 minutes during which the temperature rose to 163° C. The temperature rose to 190 C. in three hours and was maintained at 190° C.±2° for an additional four hours. The mixture was cooled, and 200 milliliters of benzene followed by 5 milliliters of water were added. The mixture was refluxed for one hour. The mixture contained 483 grams of solution from which a 5 gram sample was removed. This sample was analyzed by chromatography and gave a 55.2% yield. The remainder of the solution was filtered and stripped of volatiles up to 195° C. pot temperature at 20 millimeters pressure, leaving a residue of 262 grams. This was analyzed by chromatography and gave a 54.8% yield of N-[alpha]-phenethyl N'-phenyl-para-phenylene diamine.

EXAMPLE 4

One hundred eighty-four grams of para-amino diphenylamine were heated to 180° C. under a slow stream of dry nitrogen which was maintained during the remainder of the reaction. Styrene was added until reflux was maintained at that temperature. Then 0.5 gram of freshly cut sodium was added and styrene addition continued to maintain the reaction at 180° C.±2° for seven hours. This required 186 grams of styrene. The mixture was cooled and 200 milliliters of benzene were added followed by 2 milliliters of water. This mixture was refluxed for one hour. There were 562 grams of solution. Chromatographic analysis showed a 72.8% yield of N-[alpha-]phenethyl N'-phenyl-para-phenylene diamine.

EXAMPLE 5

One hundred eighty-four grams of para-amino-diphenylamine were melted down in a 1 liter flask under a slow stream of dry nitrogen which was maintained during the reaction. At 100° C., 0.1 gram of lithium hydride was added, and styrene started in dropwise. In 15 minutes, the temperature was at 180° C. and styrene addition was adjusted to give reflux at this temperature. One hour after initial addition of lithium hydride, 0.1 gram more was added. The mixture was then kept at 180° C. ±2° for six hours by styrene addition. This required 135 grams of styrene. After cooling, 200 milliliters of benzene were added, followed by 100 milliliters of water. The mixture was then refluxed for one hour, resulting in 467 grams of solution. Chromatographic analysis of this solution showed the yield to be 12.5%.

EXAMPLE 6

One hundred eight-four grams of para-amino-diphenylamine were melted in a 1 liter flask under a slow stream of dry nitrogen which was maintained during the reaction. At 100° C., 0.5 gram of lithium amide was added and styrene addition begun. In 20 minutes, the temperature was 180° C. and the styrene addition was adjusted to hold at 180° C.±4° with refluxing for seven hours. This required 93 grams of styrene. After cooling, 200 milliliters of benzene were added, followed by 10 milliliters of water, after which the mixture was then refluxed for one hour. This gave 471 grams of solution. Chromatographic analysis of this solution showed the yield to be 25.5%.

EXAMPLE 7

One hundred eight-four grams of para-amino-diphenylamine were melted in a 1 liter flask under a stream of dry nitrogen which was maintained during the reaction. At 80° C., 2 grams of potassium were added and at 100° C. 135 grams of styrene were added during a period of five minutes. The temperature rose to 159° C. in 25 minutes when refluxing began. In two hours it was at 190° C. and was kept at 190° C.±2° for an additional seven hours. The mixture was cooled to 80° C. after which 200 milliliters of benzene were added followed by 5 milliliters of water. The mixture was refluxed for one hour. This gave 499 grams of solution. Chromatographic analysis of the solution showed the yield to be 59.2%.

EXAMPLE 8

One hundred eighty-four grams of para-amino-diphenylamine were heated to 180° C. in a 1 liter flask under a slow stream of dry nitrogen which was maintained during the reaction. Enough styrene was added to cause reflux at that temperature. 1 gram of sodium amide was added and heating continued for 6.5 hours. Styrene was added to maintain reflux at 180° C.±2° C., requiring a total of 116 grams during the reaction. After cooling, 200 milliliters of benzene and 5 milliters of water were added. The mixture was refluxed for one hour. This gave 492 grams of solution. Chromatographic analysis of the solution gave an 11.1% content of N-phenethyl-N'-phenyl-para-phenylene diamine. This was an 18.9% yield.

EXAMPLE 9

One hundred eighty-four grams of para-amino-diphenylamine were melted in a 1 liter flask under a slow stream of dry nitrogen which was maintained during the reaction. At 90° C., 1 gram of sodium hydride, suspended in mineral oil, was added and the styrene started in dropwise. In 20 minutes the temperature was 180° C. and was kept there ±3° for six hours by styrene addition. One hundred eighty-six grams of styrene were required. After cooling, 200 milliliters of benzene were added followed by 10 milliliters of water and the solution refluxed for one hour. This gave 578 grams of solution. From chromatographic analysis of the solution, the yield was 719% of N-phenethyl N'-phenyl-para-phenylene diamine.

EXAMPLE 10

One hundred eighty-four grams of para-amino-diphenylamine were heated to 110° C. in a 1 liter flask and 3 grams of sodium were added. At 140° C., 130 grams of vinyl toluene were added dropwise in 2½ hours with temperature at about 170–185° C. The mixture was heated an additional half hour after which 80 milliliters of 95% alcohol were added during cooling. This was followed by 250 milliliters of benzene. The solution was filtered warm and distilled. Ninety-six grams of N-methyl-phenethyl-N'-phenyl-para-phenylene diamine were obtained having a boiling point of 225–230° C., and a melting point of 57–60° C. This was a 31.8% yield.

EXAMPLE 11

One hundred eighty-four grams of para-amino-diphenylamine were heated to 110° C. and six grams of sodium were added. At 160° C., 130 grams of vinyl toluene were added dropwise during a 2¼ hour period with the temperature at 180–191° C. The mixture was heated an additional hour at 165–191° C. After cooling, 10 milliliters of absolute alcohol were added followed by 5 milliliters of water. Five hundred milliliters of benzene were added and then 100 milliliters of distillate were taken off. The solution was filtered and stripped to 200° C. pot temperature at 0.8 millimeter pressure. One hundred ten grams of a dark solid remained which had a melting point of 50–55° C.

EXAMPLE 12

One hundred eighty-four grams of para-amino-diphenylamine were heated to 90° C. after which 2 grams of sodium were added. At 130° C., 20 milliliters of styrene were added followed by dropwise addition during the following hour at 175–185° C. A total of 108 grams of styrene were added. The mixture was heated an additional hour at 175–185° C. After cooling, 50 milliliters of alcohol were added. The mixture was then stripped up to 195° C. pot temperature at 25 millimeters pressure. Two hundred forty-five grams remained. Chromatographic analysis showed this to be 54.7% yield of N-phenethyl-N'-phenyl-p-phenylene diamine. This corresponds to a yield of 46.5%.

The following formulation was used to test the materials as antiozonants:

| | |
|---|---|
| Styrene-butadiene rubber | 137.50 |
| Carbon black | 68.00 |
| Processing oil | 2.00 |
| Sulfur | 2.00 |
| Zinc oxide | 3.00 |
| Diphenyl guanidine | 0.65 |
| Benzothiazyldisulfide | 0.60 |
| Antiozonant | 4.00 |

The test compounds were cured for 80 minutes at 275° F. and tested as follows:

(1) By exposing test strips at 15% elongation to approximate 100 p.p.m. of ozone for ten minutes (rapid ozone test).

(2) Exposing 6 inch tapered wedge samples, stretched to 15–30% elongation, to direct sunlight on the roof (static weathering test described in an article by J. H. Fielding, India Rubber World, vol. 115, pages 802–805, 1947), and (3) Exposing 6 inch tapered wedge samples, stretched to 10–21% elongation, to direct sunlight on the roof while flexing the samples 58 times a minute in a flexing machine (kinetic weathering test described in an article by J. H. Fielding, India Rubber World, vol. 115, pages 802–805, 1947).

The following results were obtained:

| Antiozonant | Rapid Ozone | Static 3 month | Kinetic 1 month |
|---|---|---|---|
| None | Severe cracking | Moderate to severe cracking | Severe Cracking. |
| RP-vinyl toluene and para-amino-diphenyl amine | Slight cracking | Moderate cracking | Moderate cracking. |
| N - methylphenethyl N' - phenyl-para-phenylene diamine (*Product of Example 1*). | do | Slight Cracking | Do. |
| RP-styrene and para-aminodiphenyl amine | Very slight cracking | No cracks | Slight cracking. |
| N-phenethyl-N'-phenyl-para- phenylene diamine | do | do | Do. |

The compounds were tested in inhibited catalytically cracked gasoline using the oxygen bomb induction period method (ASTM Standard Test D–525). The following results were obtained using 0.025 gram of the compounds per liter of gasoline.

| Antiozonant: | Induction period, minutes |
|---|---|
| None | 739 |
| R.P. vinyl toluene and para-amino diphenylamine | 1,206 |
| N - methylphenethyl-N'-phenyl-para-phenylene diamine | 1,150 |
| R.P. styrene and para-amino diphenyl amine | 1,224 |
| N-phenethyl - N' - phenyl-para-phenylene diamine | 1,223 |

The rubbers which can be protected by the products of this invention are the oxidizable rubbery polymers of conjugated dienes which include natural rubber and the various synthetic diene rubbers which are similar to natural rubber in their aging characteristics, such as polychloroprene; butyl rubber, which is a polymerization product of a major proportion of a mono olefin, such as isobutylene, and a minor proportion of a multi olefin, such as butadiene or isoprene; the rubbery copolymers of butadiene and styrene which may contain from 50 to 75% by weight of butadiene; the rubbery copolymers of butadiene and acrylonitrile and polyisoprene.

The products of the invention are useful as age resistors for raw rubbers in latex form, coagulated rubber latices or vulcanized rubbers, and may be present in an amount of from 0.25 to 8.0% by weight, based on the weight of the rubber, although it is generally preferred to use from 0.5 to 4.0% by weight, based on the weight of rubber.

The antioxidants of this invention can be incorporated into rubber in any customary manner. They may be added in the form of physical mixtures or in the form of emulsions using any of the known emulsifiers such as monovalent metal hydroxides, fatty acids, organic soaps, etc. They may be added to the rubber in the form of latex, or they may be milled into coagulated rubber in the usual manner.

The various highly refined hydrocarbons which can be protected by the products of this invention can be described as catalytically cracked, thermally cracked gasoline or blends thereof. Higher boiling fractions such as kerosene, fuel oil, and diesel oils are also included within the scope of this invention.

The compounds of this invention can be used to stabilize the highly refined hydrocarbons by adding about .001% to 0.1% by weight of the antioxidant to the highly refined hydrocarbons.

While certain representative embodiments and details have been shown for the purpose of illustrating the invention, it will be apparent to those skilled in this art that various changes and modifications may be made therein without departing from the spirit or scope of the invention.

I claim:

[1. An oxidizable rubbery polymer of a conjugated diene containing from 0.25 to 8.0% by weight, based on the weight of rubber, of N-alpha-phenethyl-N'-phenyl-para-phenylene diamine.]

*2. An oxidizable rubbery polymer of a conjugated diene containing from 0.25 to 8.0% by weight, based on the weight of rubber, of N-beta-phenethyl-N'-phenyl-para-phenylene diamine.*

*3. An oxidizable rubbery polymer of a conjugated diene containing from 0.25 to 8.0% by weight, based on the weight of rubber, of the reaction product obtained by reacting para-aminodiphenyl amine with styrene at a temperature between 125 and 250° C. and in the presence of a condensation catalyst selected from the group consisting of alkali metals, alkali metal hydrides and alkali metal amides.*

References Cited in the file of this patent or the original patent

UNITED STATES PATENTS

| | | |
|---|---|---|
| 2,067,686 | Semon | Jan. 12, 1937 |
| 2,494,059 | Ruggles | Jan. 10, 1950 |
| 2,810,709 | Eby | Oct. 22, 1957 |
| 2,813,124 | Rice | Nov. 12, 1957 |
| 2,822,395 | Dent | Feb. 4, 1958 |
| 2,835,705 | Lamb et al. | May 20, 1958 |
| 2,838,471 | Peterson et al. | June 10, 1958 |

FOREIGN PATENTS

| | | |
|---|---|---|
| 1,140,433 | France | July 22, 1957 |